United States Patent [19]
Kramer

[11] 3,930,419
[45] Jan. 6, 1976

[54] CASING FOR SHAFTS AND CABLES
[75] Inventor: Morton Kramer, Pittsfield, Mass.
[73] Assignee: General Electric Company, Pittsfield, Mass.
[22] Filed: July 10, 1973
[21] Appl. No.: 377,926

[52] U.S. Cl. .......... 74/501 P; 138/131; 138/DIG. 7; 428/375; 308/3 R
[51] Int. Cl.² .......................................... F16C 1/10
[58] Field of Search ...... 138/121, 122, 131, DIG. 7, 138/125, 110; 74/501 P; 161/172, 175, 179; 264/209; 308/3 R; 428/375

[56] References Cited
UNITED STATES PATENTS

| | | | |
|---|---|---|---|
| 2,143,960 | 1/1939 | Stalter et al. | 138/110 |
| 2,465,319 | 3/1949 | Whinfield et al. | 161/172 |
| 2,728,356 | 12/1955 | Brinsmade et al. | 138/DIG. 7 |
| 2,850,915 | 9/1958 | Bratz | 138/131 UX |
| 2,898,941 | 8/1959 | Kilcup | 138/122 X |
| 2,999,497 | 9/1961 | Hamilton et al. | 138/121 X |
| 3,177,901 | 4/1965 | Pierce | 74/501 P |
| 3,294,122 | 12/1966 | Sharp | 138/110 |
| 3,302,479 | 2/1967 | Conrad | 74/501 P |
| 3,349,805 | 10/1967 | Fried | 138/122 X |
| 3,354,742 | 11/1967 | Tschanz et al. | 74/501 P |

Primary Examiner—Richard C. Queisser
Assistant Examiner—Daniel M. Yasich
Attorney, Agent, or Firm—Granville M. Pine; Edward A. Hedman; William F. Mufatti

[57] ABSTRACT

A conductor or casing for shafts and cables, comprising a plastic tubular member having over a portion of its length a plurality of convolutions to permit bending and longitudinal compression and extension without substantial reduction in the internal diameter.

9 Claims, 4 Drawing Figures

CASING FOR SHAFTS AND CABLES

This invention relates to conductors or casings for shafts and cables which transmit longitudinal and rotary motions and forces. More particularly, the invention relates to tubular conductors for shafts and cables between activating and/or indicating components, e.g., in speedometer cables and hood-latch releases in the automotive industry and rudder, flap and elevator controls in the aircraft industry.

A variety of materials and constructions are used to make conductors or casings for many types of "push-pull" and rotary motion cables and shafts. In such devices, the major function is to activate a switch or release or to open a panel or move an indicator by providing a longitudinal or rotary action from several inches to several feet away from the activating lever or indicator. The shafts and cables in such assemblies are usually carried in tubular conductors to eliminate friction and wear at support points, such as firewalls in automobiles and to prevent the rotary motion of certain cables from entangling adjacent wires and the like. Traditionally, the tubular conductors have been multi-wall constructions of rubbery or solid (e.g., metal) materials to provide the necessary flexibility to avoid kinking the activating shafts. Such multi-wall conductors are difficult to fabricate because they use a variety of materials, such as a rubber inner wall of a lubricated type, then wire braiding for stiffness and strengthening against twisting and finally an outer cover of rubber, usually different from that of the inner wall, to provide protection against chemicals, gasoline, heat and the like.

It is a principal object of the present invention to provide a conductor constructed so that one material can be employed to provide the required stiffness, flexibility and kink resistance. Although many materials of construction are suitable, the use of engineering thermoplastics, and polyesters in particular, is especially advantageous because the device thereby provided is smooth, and therefore relatively friction-free, and, if a suitable material is selected, the conductors will be resistant to many adverse environments, such as the heat and hydrocarbon vapors found in under-the-hood automotive uses. The devices, even when made from plastics, are strong enough to avoid the need for reinforcing wire or fabrics. Moreover, the special design of the present devices is uniquely suited to overcome the substantial differences in fit due to variations in the coefficient of expansion between stationary and movable components and the cable, shaft, tube, and the like.

DESCRIPTION OF THE DRAWINGS

The invention is illustrated in the accompanying drawings in which.

DESCRIPTION OF THE INVENTION

According to the present invention, a conductor for shafts, cables and the like comprises a tubular member having over a portion of its length a plurality of convolutions to permit bending and longitudinal compression and extension without a substantial reduction in the internal diameter of the member.

Preferably, the tubular member consists for the major portion of its length of a plurality of abutting convolutions, and it will terminate at one and, preferably, at both ends, in a cylindrical end portion. The convolutions permit a limited amount of extension and compression of the tubular member and bending through simple or compound curves.

Figure 1:
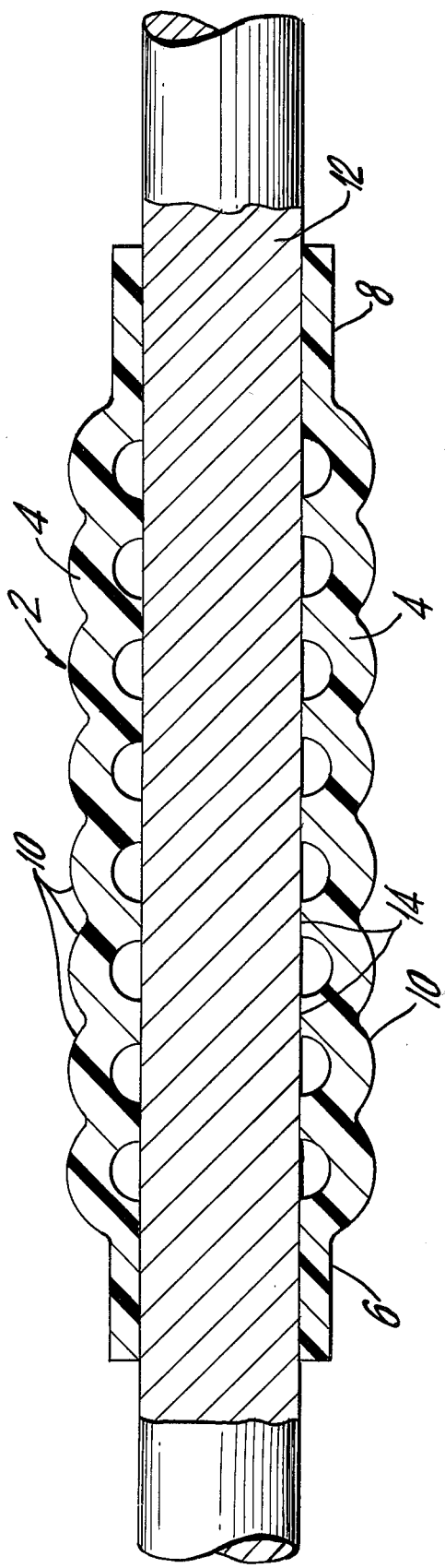
FIG. 1 is a central longitudinal section of a conductor according to this invention, having a plurality of abutting convolutions.
Figure 3:
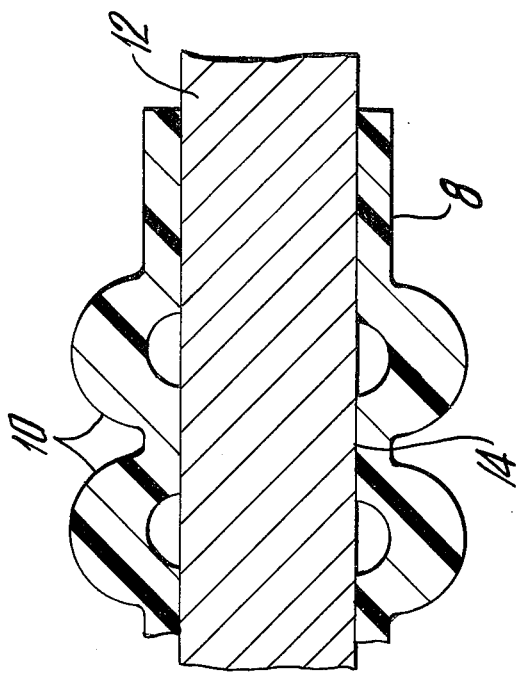
FIG. 3 is a central longitudinal section of another conductor according to this invention, in which the convolutions are not abutting, thus giving even greater flexibility (and less resistance to twisting).
Figure 2:
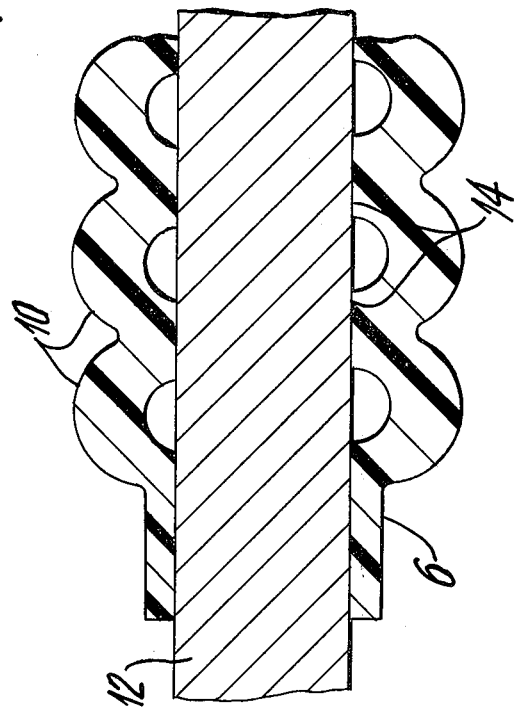
FIG. 2 is a central longitudinal section of another embodiment of a conductor according to this invention, in which the convolutions are still abutting, but the distance between repeating units is greater, affording more flexibility.
Figure 1A:
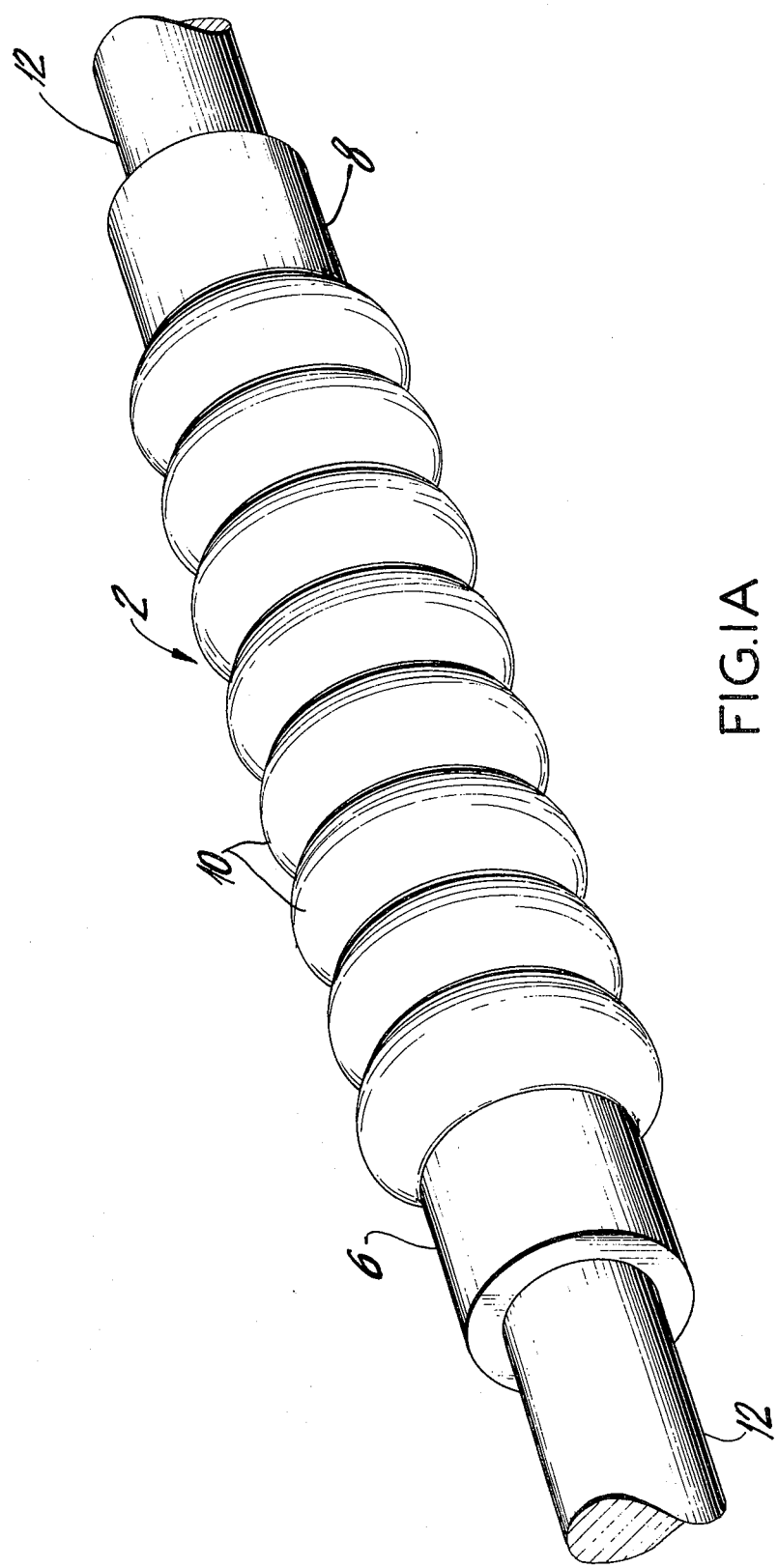
FIG. 1A is a perspective view of the device of FIG. 1.

The convolutions may be accordion-like, or corrugated, and the like, but conveniently they will be smoothly curved, i.e., comprising arcuate ridges and arcuate hollows. In preferred embodiments, the convolutions will have substantially constant wall thickness. In other preferred embodiments, each convolution will have a semicircular cross-section in an axial plane. The convolutions may or may not join at the base, depending on the stiffness desired. If the convolutions are abutting, then the stiffness will be at a maximum (FIGS. 1 and 2). This is best where the cables have long runs or are of small diameters and kinking would be a serious problem. Those embodiments in which the convolutions do not abut, e.g., FIG. 3, are less stiff, and this is desirable in many applications, e.g., for short runs or for relatively thick and stiff cables where kinking is less of a problem.

In general, if the wall thickness is increased, flexibility decreases and stiffness increases. So too, at the same pitch, or repeating distance between convolutions, an increase in the radial height of the convolutions at the same wall thickness will cause a decrease in flexibility and in stiffness.

One major advantage in the design of the present conductor is that it permits the stiffness and flexibility to be varied by varying the pitch, wall thickness and radial height of the convolutions. This permits the convoluted tube to be load bearing.

A variety of materials, including metals and non-metals, are useful to make the conductors of this invention. Especially useful are the commercially important high molecular weight engineering thermoplastics. Illustrative are acrylonitrile-butadiene-styrene terpolymers, acetal resins, acrylic resins, cellulosic resins, fluoroplastics, ionomers, methylpentene resins, nylons, polyester resins, polyphenylene ethers, polyallomers, polycarbonates, polyethylene, polyimides, polypropylene, modified polystyrenes, polysulfones, polyvinyl chloride, and many others. Especially preferred are thermoplastic polyester resins of the diol terephthalate type, and special mention is made of poly(1,4-butylene terephthalate).

The conductor can be made from thermoplastic materials in a number of ways, e.g., by standard closed mold heat and pressure forming techniques and by blow molding into a closed shaped mold. However, because no expensive fixed-design molds are required, it is especially convenient to extrude a hot thermoplastic onto a traveling conveyor which is programmed to hesitate then move and repeat the cycle, each of which cycles produces a single series of convolutions, the length of which is determined by the mold or machine, then to allow the conductor tube to cool to structural rigidity.

In use, the conductor will be mounted in place, e.g., by fastening the ends, respectively, to brackets on a latch and a handle. Then the shaft or cable will be pushed through the conductor and fastened into place. The conductor will grasp a suitably sized cable and, if desired, cylindrical portions at one or both ends of the conductor can be provided to facilitate clamping.

Materials which can be used for manufacturing of the conductor have been described above. Because of its low crystallization point and very rapid rate of crystallization from the melt, poly(1,4-butylene terephthalate) is preferred. Such polyesters are described in Whinfield et. al., U.S. Pat. No. 2,465,319.

DESCRIPTION OF THE PREFERRED EMBODIMENTS

Referring to FIG. 1, a conductor for shafts and cables consists of tubular member 2 having central convoluted portion 4 and optional cylindrical end portions 6 and 8. The tube is extruded of poly(1,4-butylene terephthalate), such as the product designated VALOX and manufactured by General Electric Company. Convoluted portion 2 consists of a series of coaxial convolutions 10 of a bubble like configuration, each having a semi-circular cross section in an axial plane (although triangular cross-sections also are possible), and substantially uniform wall thickness.

In the embodiment shown, optional cylindrical end pieces 6 and 8 have the same wall thickness as the convolutions, but this is for convenience and is not a critical design feature.

Also shown in FIG. 1 is shaft 12 of metal or the like which serves to illustrate the manner in which the conductor slidably or rotatably supports at points 14 such a complementary component.

In FIG. 2 is shown a modification in which the repeating distance between convolutions 10 and the axial height both are increased (in comparison with the conductor of FIG. 1). Because the number of circumferential supports 14 will be fewer for a given length of central convoluted portion 4, all other factors, wall thickness, etc., being constant, shaft 12 is more free to slide and rotate. The flexibility of this conductor is less than that shown in FIG. 1 because the convolutions are not as closely abutting. This embodiment is still hard to kink.

In FIG. 3 there is shown still another conductor according to this invention in which the convolutions 10 are not abutting convolutions. This is the least flexible of the three embodiments and exerts the least amount of restraint at points 14 on shaft 12 with respect to twisting and longitudinal motion. It is somewhat less resistant to kinking.

There has thus been described a convoluted conductor for shafts and cables which provides any desired measure of stiffness, which stiffness is adjustable by varying the wall thickness and configuration of various areas of convolution. The conductors are flexible because of the basic function of the convolutions. The use of polymeric materials of construction provides a simplified single wall conductor which minimizes friction as between the conductor and a cable or shaft carried therewithin, and eliminates the need for reinforcing braids, while, with the proper choice of polymer, at the same time providing resistance to adverse environments.

It is to be understood that other variations are possible in light of the above detailed description. Any such changes are within the full intended scope of the invention as defined by the appended claims.

I claim:

1. A casing for shafts and cables, said casing comprising a kink-resistant flexible tubular member having over at least a portion of its length a plurality of convolutions provided with axially-spaced internal circumferential supports capable of slidably supporting a shaft or cable at spaced intervals along the length thereof, thereby permitting bending and longitudinal compression and extension without substantial reduction in the internal diameter of said supports, said casing being made from a high molecular weight engineering thermoplastic.

2. A casing as defined in claim 1 wherein the tubular member consists of a convoluted portion and at least one cylindrical end portion.

3. A casing as defined in claim 1 wherein the convolutions are arcuate ridges and hollows.

4. A casing as defined in claim 1 wherein the convolutions are abutting convolutions.

5. A casing as defined in claim 1 wherein the convolutions have substantially constant wall thickness.

6. A casing as defined in claim 1 wherein each convolution has a semi-circular cross-section in an axial plane.

7. A casing as defined in claim 1 wherein the thermoplastic is selected from acrylonitrile-butadiene-styrene terpolymers, acetal resins, acrylic resins, cellulosic resins, fluoroplastics, ionomers, methylpentene resins, nylons, polyester resins, polyphenylene ethers, pollyallomers, polycarbonates, polyethylene, polyimides, polypropylene, modified polystyrenes, polysulfones, or a polyvinyl chloride.

8. A casing for shafts and cables, said casing comprising a unitary, stiff, flexible and kink-resistant tubular member having over a portion of its length a plurality of convolutions provided with axially-spaced internal circumferential supports capable of rotatably and slidably supporting a shaft or cable at spaced intervals along the length thereof, thereby permitting bending and longitudinal compression and extension without a substantial reduction in the internal diameter of said supports, said casing being made from a high molecular weight thermoplastic poly(1,4-butylene terephthalate).

9. In a flexible casing assembly of a metallic core element movable within a tubular casing member and extending beyond the ends thereof, the improvement comprising a tubular casing member that is unitary, stiff, flexible and kink-resistant and having over a portion of its length a plurality of convolutions provided with axially-spaced internal circumferential supports capable of rotatably and slidably supporting said core element at spaced intervals along the length thereof, thereby permitting bending and longitudinal compression and extension without a substantial reduction in the internal diameter of said supports, said casing member being made from a high molecular weight friction-free engineering thermoplastic.

* * * * *